United States Patent Office 3,567,787
Patented Mar. 2, 1971

3,567,787
2,2'-TRIMETHYLENEDIHYDROXYAROMATIC
SYNTHESIS
Henry E. Hennis, Coleman, Mich., assignor to The Dow
Chemical Company, Midland, Mich.
No Drawing. Filed Sept. 22, 1967, Ser. No. 669,706
Int. Cl. C07c 37/00, 39/16
U.S. Cl. 260—619                                    7 Claims

ABSTRACT OF THE DISCLOSURE 2,2'-trimethylenedihydroxyaromatic compounds useful in resin production are made by hydrogenation of their corresponding 6H, 12H-6,12-methano[b,f][1,5]-dioxocin in the presence of a noble metal catalyst and an inert solvent at temperatures between 75° and 100° C.

BACKGROUND OF THE INVENTION

The preparation of 2,2' - alkylenebishydroxyaromatic compounds has heretofore been very difficult. This is because hydroxyaromatics are predominantly para-directing. For example, if one attempts to alkylate phenol with a difunctional alkylation reagent, one obtains primarily the p,p'-product, some o,p'-product, and very little if any isolable o,o'-product. One way around this situation is to use blocking groups to block the more active para-position, substitute at the desired ortho-position and then remove the blocking groups. This method has several objections, including the fact that two extra steps are involved. Also, the directive and deactivation influences by a typical blocking group are not conducive to clean reactions.

SUMMARY OF THE INVENTION

It has now been found that catalytic hydrogenolysis of dioxocins having the formula

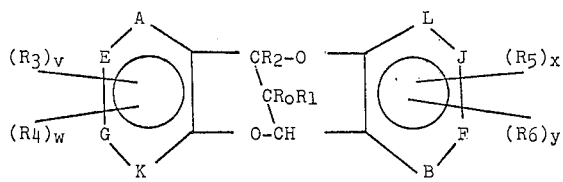

will produce 2,2'-trimethylenedihydroxyaromatic compounds having the formula

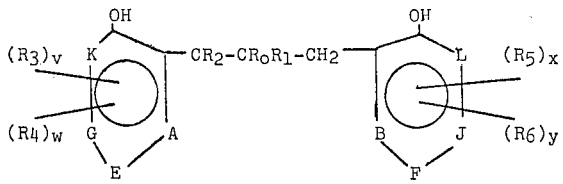

where in the above formulas each of $v$, $w$, $x$, and $y$ independently is a number from 0 to 4; each of A, B, E, F, G, J, K and L independently is N or CH provided that neither A and E, E and G, G and K, B and F, F and J, or J and L can simultaneously be N; $R_0$ is H; $R_1$ is H, OH, aryl having up to ten carbon atoms (preferably those having up to six carbon atoms), or alkyl having up to eighteen carbon atoms (preferably those having up to four carbon atoms); $R_0$ and $R_1$ may form the cyclohexane ring; $R_2$ is H, aryl having up to ten carbon atoms (preferably those having up to six carbon atoms), or alkyl having up to eighteen carbon atoms (preferably those having up to four carbon atoms); each of $R_3$, $R_4$, $R_5$ and $R_6$, if present, independently is a substituent inert under the reaction conditions, being absent when the corresponding subscript $v$, $w$, $x$ or $y$ is 0; and $R_3$ combined with $R_4$, as well as $R_5$ combined with $R_6$, may form a heterocyclic or homocyclic ring which is inert under the reaction conditions. Examples of $R_3$, $R_4$, $R_5$ or $R_6$ substituents are alkyl (preferably those having up to eighteen carbon atoms, most preferably those having up to four carbon atoms), aryl (preferably those having up to ten carbon atoms, most preferably those having up to six carbon atoms), $NO_2$, halogen, and OM (where M is a hydrocarbon radical having up to eighteen carbon atoms, preferably an alkyl radical having up to four carbon atoms). Examples of heterocyclic and homocyclic rings which may be formed by $R_3$ combined with $R_4$, as well as $R_5$ combined with $R_6$, are the pyridine, pyrimidine, quinoline, benzene, naphthalene, anthracene, phenanthrene and pyran rings. An example of a specific 2,2'-trimethylenedihydroxyaromatic compound which is prepared by the process is o,o'-trimethylenediphenol

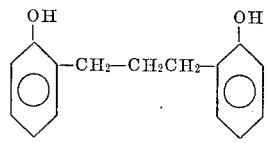

where in the general formula above, $R_0$, $R_1$ and $R_2$ are H, $v$, $w$, $x$ and $y$ are each 0 and A, B, E, F, G, J, K and L are CH. This compound is prepared by the hydrogenolysis of its corresponding dioxocin, 6H,12H-6,12-methanodibenzo[b,f][1,5]dioxocin.

In order to produce these 2,2'-trimethylenedihydroxyaromatic compounds as defined above, a dioxocin corresponding to the compound desired is heated under pressure in the presence of an inert solvent, hydrogen, and a catalyst. The preferred pressure is between 50 and 500 p.s.i. However, higher pressures may be used without harming the synthesis.

The catalysts which are operable are the noble metal catalysts, such as palladium or platinum. The catalyst may be used in the pure form or on the usual catalytic supports such as carbon, alumina, calcium carbonate, silica gel, asbestos, or kieselguhr. Any ratio of reactant to catalyst is operable, but I prefer to use a weight ratio of between 100:1 and 1:1. The high ratios give hydrogenolysis which is too slow to be practical and the low ratios are undesirable from a cost standpoint. The critical reaction parameter is the temperature. It must be high enough to open the dioxocin ring but not so high as to hydrogenate the aromatic rings. I prefer to use a temperature between 75° and 100° C. A temperature of around 75° C. is required to break the dioxocin ring but temperatures above around 100° C. lead to hydrogenation of the aromatic rings. The solvent used is one which is inert to the reaction conditions. The usual solvents may be used such as the hydrocarbon, alcohol, and ether solvents. Examples of specific solvents which may be used are as follows: xylene, benzene, toluene, hexane, cyclohexane, skelly solvent, methanol, ethanol, diethyl ether, and dibutyl ether.

After the reaction, the catalyst is filtered out and the solvent is removed by distillation, the residue is then mixed with an alkali or alkaline earth metal base, such as a 5% sodium hydroxide solution; extracted with a water-immisible organic solvent, such as carbon tetrachloride; and acidified with an inorganic acid, such as Dry Ice. The solid which precipitates is then recrystallized with a solvent such as petroleum ether to give the 2,2'-trimethylenedihydroxyaromatic compound desired. The methanodioxocin starting material is prepared by reacting an o-vinylhydroxyaromatic compound and an aromatic o-hydroxyaldehyde in the presence of an acid catalyst as is more fully set out in my application filed concurrently herewith entitled "Methanodioxocins and a Process for Making Them," Ser. No. 669,694, the disclosure of which is incorporated herein by reference. Substantially any of the dioxocins there disclosed can be converted to the corresponding alkylenebisphenol by the present process.

The 2,2'-trimethylenedihydroxyaromatic compounds produced, being alkylenebisphenols, are useful in resin production analogous to the use of known bisphenols. In general, any dihydroxy compound is a convenient resin starting material. For example, a polycarbonate resin is formed by adding $COCl_2$ and a base to 2,2'-trimethylenediphenol. Similarly, one can produce an epoxy resin by adding a haloalkylene oxide and a base to 2,2'-trimethylenediphenol and treating the product with a catalyst.

DESCRIPTION OF SPECIFIC EMBODIMENTS

Specific examples of production of 2,2'-trimethylenedihydroxyaromatic compounds are reported below.

EXAMPLE 1

Into a 1 liter pressure reactor were placed 2.00 g. of 6H,12H-6,12-methanodibenzo[b,f][1,5]dioxocin, 5 g. of palladium (5%)-on-carbon catalyst, and 250 ml. of absolute ethanol. The mixture was stirred and heated at 75° C. under 200 lb./in.² of hydrogen pressure for 4 hours. The catalyst was collected on a Buchner funnel. The ethanol was removed by distillation under reduced pressure. The viscous, colorless residue was mixed with an excess of 5% sodium hydroxide solution and filtered to remove a small amount of insoluble material. The alkaline solution was extracted with carbon tetrachloride and then carbonated with Dry Ice. The solid which precipitated was recrystallized from Skellysolve solvent (B.P. 60–100° C.) to give 0.61 g. (30% yield) of o,o'-trimethylenediphenol, M.P. 95.5–96° C.

EXAMPLE 2

In a similar manner, 13-methyl-6H,12H-6,12-methanodibenzo[b,f][1,5]dioxocin was hydrogenolyzed. From 6.0 g. of starting material there was obtained 1.5 g. (25% yield) of 2-methyl-1,3-di(o-hydroxyphenyl) propane as fine white needles, M.P. 118.5–119° C.

EXAMPLE 3

In a similar manner, 4,13-dimethyl-6H,12H-6,12-methanodibenzo[b,f][1,5]dioxocin was hydrogenolyzed. From 2.0 g. of starting material, there was obtained 0.08 g. (4% yield) of 2-methyl-1-(2-hydroxyphenyl)-3-(3-methyl-2-hydroxyphenyl) propane as fine white needles, M.P. 108–110° C.

I claim:
1. A process for making a 2,2'-trimethylenedihydroxyaromatic compound having the formula

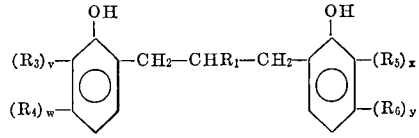

wherein each of $v$, $w$, $x$ and $y$ independently is 0 or 1; $R_1$ is H or alkyl of up to 4 carbon atoms; each of $R_3$, $R_4$, $R_5$ and $R_6$ being absent when the corresponding subscript $v$, $w$, $x$ or $y$ is 0, if present, is independently, alkyl of up to 4 carbon atoms, said process comprising hydrogenolysis of the corresponding methanodioxocin in the presence of a platinum or palladium catalyst and an inert solvent at a temperature between 75° and 100° C. and a pressure above 50 p.s.i.

2. A process as defined in claim 1 wherein the catalyst is palladium.

3. A process as defined in claim 1 wherein the catalyst is platinum.

4. A process as defined in claim 1 wherein the weight ratio of reactant to catalyst is between 100:1 and 1:1.

5. A process as defined in claim 1 wherein $R_1$ is H.

6. A process as defined in claim 1 wherein $R_1$ is alkyl of up to 4 carbon atoms.

7. A process as defined in claim 1 wherein $R_1$ is H and $v$, $w$, $x$ and $y$ are each 0.

References Cited

UNITED STATES PATENTS 3,105,767  10/1963  Arabian _____ 260—619
3,122,563  2/1964  Kaiser et al. _____ 260—619

BERNARD HELFIN, Primary Examiner

N. P. MORGENSTERN, Assistant Examiner

U.S. Cl. X.R.

260—241, 248, 250, 269, 283, 289, 290, 297, 340.3, 345.2, 618, 620